INVENTOR.
NEAL G. LOZINS
BY Roger W. Hensen
ATTORNEY

April 5, 1966 N. G. LOZINS 3,244,887
RADIATION TRACKING APPARATUS WITH PULSE COUNTERS FOR PRODUCING
OUTPUT INDICATIVE OF POINTING ERROR
Filed Dec. 3, 1962 3 Sheets-Sheet 2

INVENTOR.
NEAL G. LOZINS
BY
Roger W. Jensen
ATTORNEY

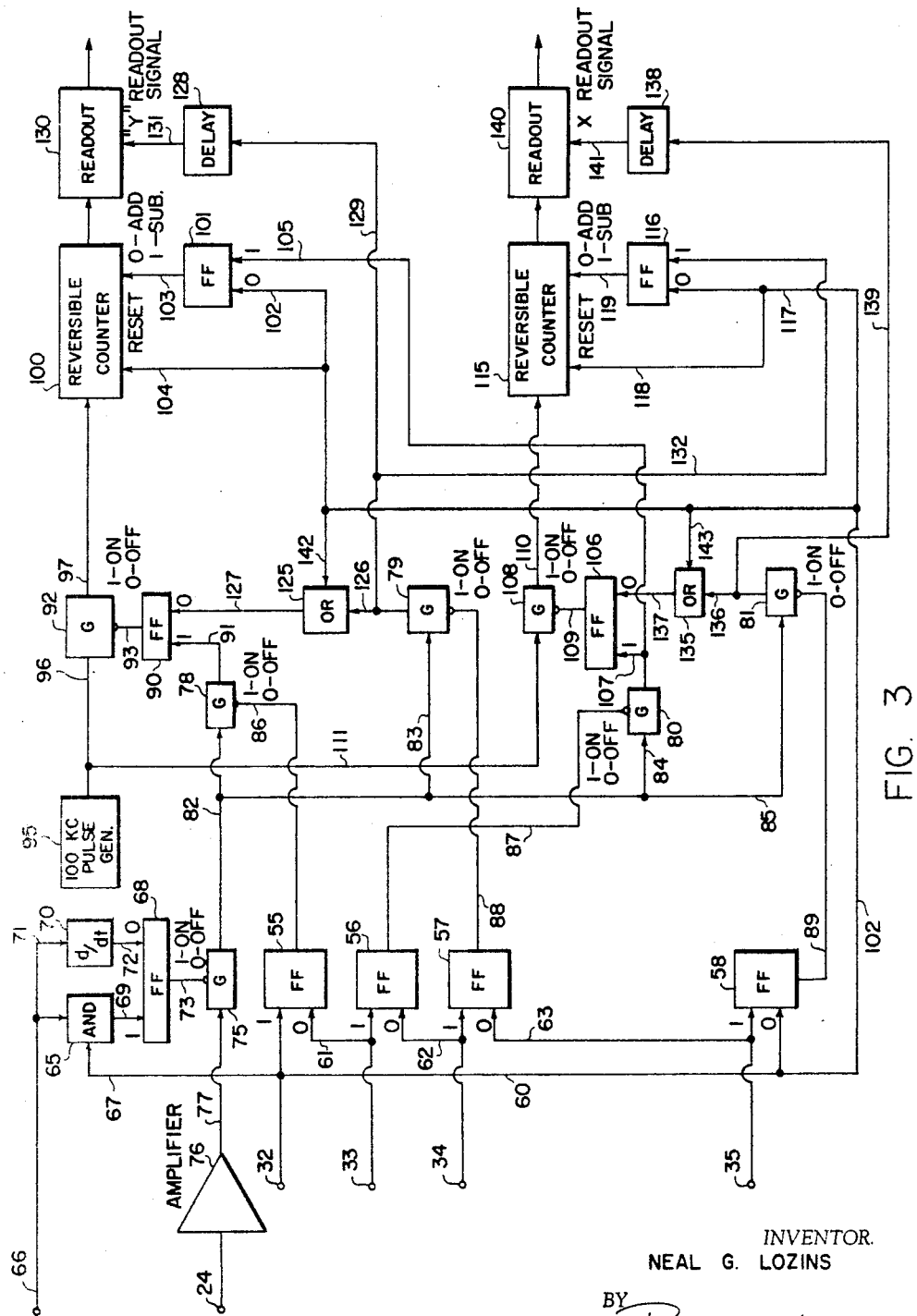

United States Patent Office 3,244,887
Patented Apr. 5, 1966

3,244,887
RADIATION TRACKING APPARATUS WITH PULSE COUNTERS FOR PRODUCING OUTPUT INDICATIVE OF POINTING ERROR
Neal G. Lozins, Largo, Fla., assignor to Honeywell Inc., a corporation of Delaware
Filed Dec. 3, 1962, Ser. No. 241,761
3 Claims. (Cl. 250—203)

This invention pertains to radiation trackers and more particularly to a radiation tracker producing a digital output indicative of the error in pointing said radiation tracker at a desired source.

In prior art devices the sighting unit, which may simply be a telescope, is pointed at a star or other radiation source and focuses the light into an image which is chopped or interrupted by a variety of methods before being sent to a radiation detector. The radiation detector generally consists of a plurality of sensing elements in the shape of a cross, a pyramid, or some such configuration. Each of the sensing elements are connected by means containing amplifiers to servomotors which are in turn connected to move the sighting unit in a positive or negative direction depending upon the input to the servomotor. Thus, when the sighting unit has the desired radiation source in its field of view the sensing elements produce signals indicative of the amount of radiation they are receiving. If one sensing element receives more radiation than the others, the servomotor to which it is attached is energized and rotates the sighting unit back to a position where all of the sensing units are again receiving an equal amount of radiation. The sighting unit must be continually moved to maintain the radiation source approximately in the center of the field of view.

It can be seen that a great deal of error will be introduced into this type of system when the radiation falling on the sensing elements is approximately equal, since smaller differences in radiation striking the detectors produces smaller output signals. Also, extremely accurate servomotors must be used to maintain the sighting unit precisely pointed so that the radiation source is in the center of the field of view.

In the prior art devices some means must be provided for producing the desired information and to indicate the direction in which the sighting unit is pointing. In general the signals to the servomotors are utilized and, as has already been explained, as the error in pointing approaches zero the output signals also approach zero and becomes practically useless.

In the present invention the output, or image, from image forming means, which may be a telescope, is caused to move in a circular pattern upon a reticle by means of a nutating mirror or similar device such as an optical wedge. The reticle consists of a plurality of alternate transparent and opaque portions arranged in a circular pattern. Radiation detecting means are mounted in alignment with said reticle so as to receive radiation passing therethrough. The radiation detecting means may consist of several photodetectors or a single photodetector with the output properly gated as will be explained later. As the image from the telescope is moved past the alternate transparent and opaque portions of the reticle the radiation detecting means will produce a continuous sequence of square pulses due to any radiation source that is imaged in the telescope output. If the radiation source is in the center of the field of view of the telescope the image of the radiation source will follow a circular path concentric with the center of the reticle. In this instance, the square pulses produced by the radiation detecting means will be of equal duration. If the radiation source is displaced from the center of the field of view of the telescope its image will follow a circular path on the reticle having a center displaced from the center of the reticle by an amount equal to the amount the radiation source is displaced from the center of the field of view of the telescope. In this instance, the square pulses from the radiation detecting means will not be equal in duration.

The square pulses from the radiation detecting means along with a sequence of square pulses from a commutator on the nutating mirror are applied to a group of amplifiers, gates, and flip-flops which actuate, reverse, and stop two reversible counting means. Also applied to the counting means is the output of a pulse generating means. A first square pulse from the radiation detecting means causes the first reversible counting means to be turned on. This counting means begins to count pulses from the pulse generator. A second square pulse from the radiation detecting means causes the first counting means to be reversed and the second reversible counting means to be turned on. The first counting means is still accepting pulses from the pulse generating means but it is counting towards zero while the second counting means is accepting pulses from the pulse generating means but it is counting away from zero. A third square pulse from the radiation detecting means turns the first counting means off and reverses the second counting means. The fourth square pulse from the radiation detecting means turns the second counting means off. Thus, the remaining count in the first counting means is an indication of the difference in time between the first and second square pulses and the second and third square pulses from the radiation detecting means and the count remaining in the second counting means is an indication of the difference in time between the second and third square pulses and the third and fourth square pulses from the radiation detecting means. The difference in time between square pulses from the radiation detecting means is a direct indication of the displacement of the radiation source from the center of the field of view of the telescope. Thus, the output of the two counting means is a direct indication of the error in pointing of the telescope.

The present invention has a great advantage over the prior art because a small displacement does not cause a small output signal but instead produces a small number of digital output pulses. Furthermore, in the event that a multiplicity of photodetectors are used, it is not necessary that they be matched with respect to responsivity, scale factor, or sensitivity. Also, the present invention does not have to be continually servoed since the ouput is a direct indication of the error. Thus, in the present invention if the radiation source does not appear directly centered in the field of view of the telescope a digital indication of the error in pointing will be produced each time the star image is moved completely around the reticle. This error may be averaged over a plurality of cycles to further reduce the errors of the invention. Thus, it can be seen that a highly accurate radiation tracking device is disclosed which has many advantages over the prior art devices.

It is a primary object of this invention to provide an improved control apparatus.

It is a further object of this invention to provide an improved radiation tracking device.

It is a further object of this invention to provide a radiation tracking device with a highly accurate digital output.

These and other objects of this invention will become apparent from the following description of a preferred form thereof and the accompanying specification, claims and drawings, of which:

FIGURE 3 is a block diagram of the electronics; and

Figure 1:
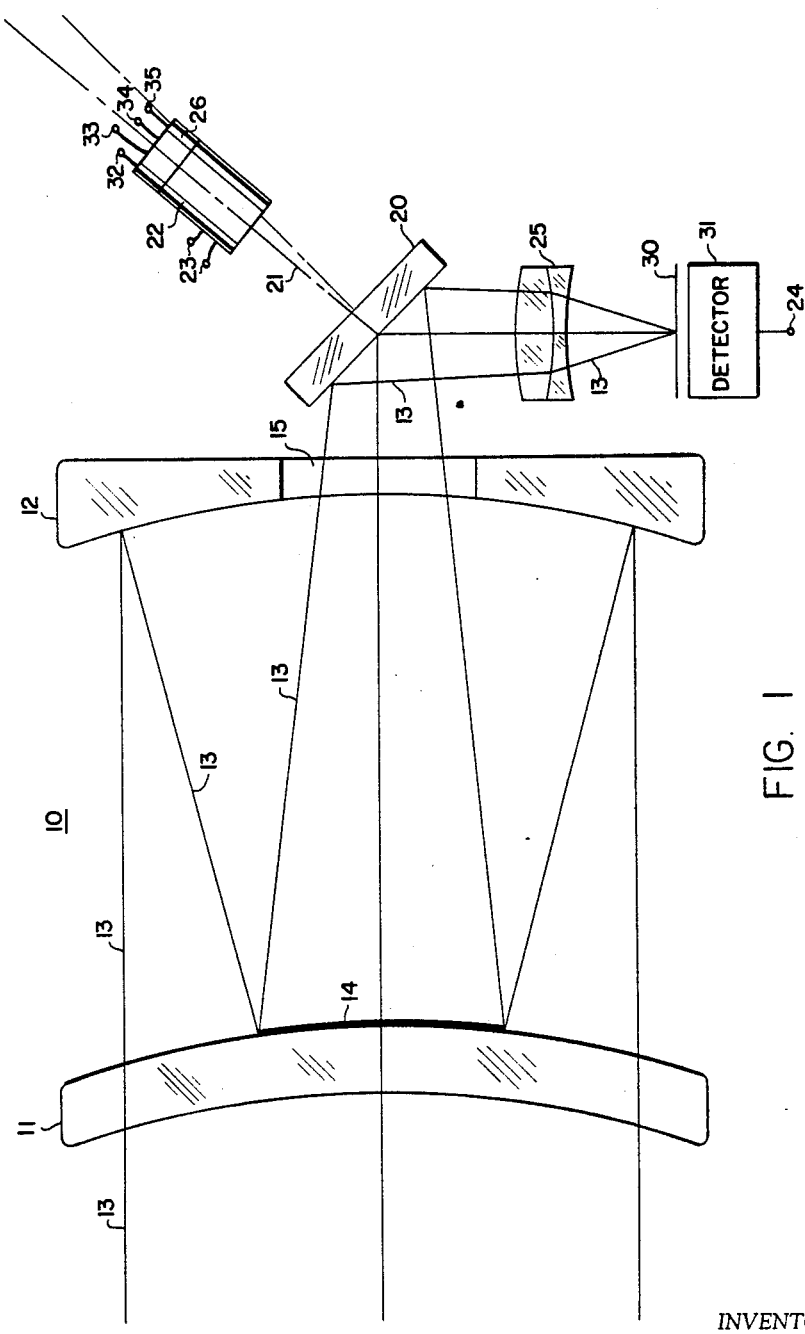
FIGURE 1 is a schematic diagram of the optical system.

In FIGURE 1 a representative configuration of image forming means 10 is shown as a telescope comprising a meniscus corrector 11 and a primary reflector 12. The incoming radiation, which in this embodiment is light such as starlight, is shown as solid lines. For simplicity only one such representative beam of light will be followed through the optical system. The beam of light to be followed is numbered 13 throughout the drawing to indicate that it is a signal beam. Light beam 13 passes through the meniscus corrector 11 to the front surface of the primary reflector 12 where it is reflected to the back side of the meniscus corrector 11. A secondary reflector 14 may be constructed by simply silvering a portion of the back side of meniscus corrector 11. The secondary reflector 14 should be a circular shaped mirror conforming to the curvature of the back side of the meniscus corrector and located approximately centrally in that lens. The beam of light 13 that is reflected from primary reflector 12 strikes secondary reflector 14 and is reflected through an aperture 15 in primary reflector 12. Aperture 15 should be circularly shaped and of approximately the same diameter as secondary reflector 14. Aperture 15 should be located approximately centrally in primary reflector 12 so that light reflecting from secondary reflector 14 may pass therethrough. Light beam 13 passing through aperture 15 strikes a nutation mirror 20.

Nutation mirror 20 is a front surface reflecting mirror which is mounted for rotation by means of a shaft 21 to a motor 22. Nutation mirror 20 is attached to shaft 21 in a manner to form an angle other than 90° therewith. That is, the shaft 21 is not perpendicular to the plane of the mirror 20. Thus, as mirror 20 is rotated by motor 22 a nutation effect is produced on the beams of light from aperture 15. Motor 22 is energized by applying a proper potential between a pair of leads 23. Also attached to motor 22 is a commutator 26 having four leads 32 through 35 attached thereto. A sequence of square pulses appear on leads 32 through 35 which indicate the approximate angular position of the mirror 20 as will be explained in more detail later.

The light beam 13 passing through aperture 15 reflects from nutation mirror 20 to a condensing lens 25 which focuses the light beams and, thus, the image onto a reticle 30. Any light passing through reticle 30 strikes a detecting means 31. As light strikes detecting means 31 electrical signals are produced which will appear on lead 24 attached to detecting means 31. The operation of reticle 30 and detecting means 31 is explained more fully in conjunction with FIGURE 2.

Figure 2:
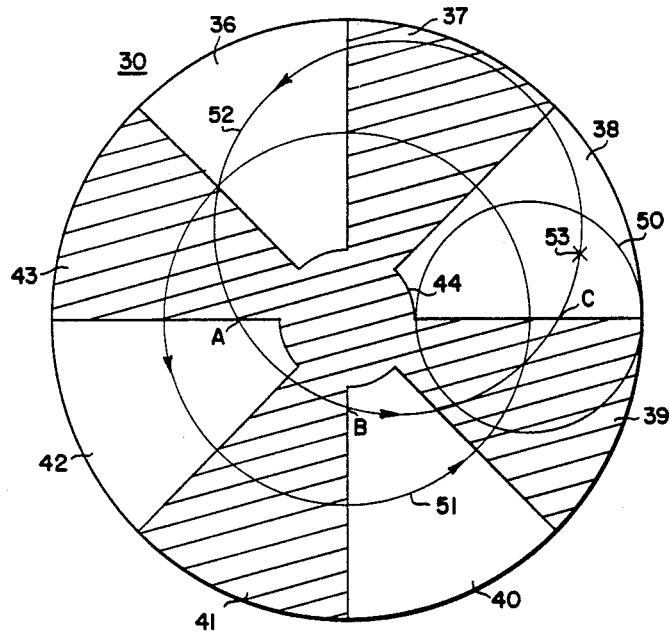
FIGURE 2 is a diagram of the reticle including an example of a possible image path.

In FIGURE 2 the reticle 30 is shown having a plurality of alternate transparent and opaque portions arranged in a circular pattern. In this preferred embodiment eight alternate transparent and opaque portions having approximately equal arcuate width are shown. However, it should be understood that a variety of patterns could be produced by one skilled in the art and this invention is not to be limited by the preferred embodiment shown. Portions 36, 38, 40 and 42 are transparent while portions 37, 39, 41 and 43 and a centrally located concentric disk shaped portion 44 are opaque. The instantaneous edge of the image of telescope 10 reflected from mirror 20 upon reticle 30 is represented by a circular pattern 50. The diameter of the image of telescope 10, or the diameter of circular pattern 50, is equal to the distance from the outer periphery of disk shaped portion 44 to the outer periphery of the transparent and opaque portions of reticle 30. As nutation mirror 20 is rotated by motor 22 the center of the image 50 of telescope 10 is caused to move in a circular path 51 about reticle 30 and concentric therewith.

A small cross 53 within circular image 50 is representative of the image of a radiation source such as a star. Star image 53 is shown displaced from the center of the image 50 of telescope 10. This occurs when the star does not appear at the center of the field of view of the telescope 10. As the telescope image 50 is caused to revolve about circular path 51 on reticle 30 there is no rotation of the telescope image and, therefore, the star image 53 follows a circular path 52. Since the star image 53 is displaced from the center of the telescope image 50 the circular path 52 is not concentric with reticle 30. Any star image located at the center of the telescope image 50 will follow circular path 51 which is concentric with reticle 30. However, any star which is displaced from the center of telescope image 50 will follow a circular path, for example 52, which is not concentric with reticle 30.

As can be seen in FIGURE 2, a star image following circular path 51 will spend an equal amount of time in each opaque and transparent portion of reticle 30. However, a star image following a nonconcentric circular path, such as 52, will remain in some of the transparent and opaque portions a greater length of time than others. Thus, the instant at which the star image first enters a transparent portion will vary in relation to the instant that it entered the previous transparent portion as the position of the star varies with relation to the center of the field of view of telescope 10.

Detector 31, which is placed in alignment with reticle 30, transforms the light passing through reticle 30 to electrical energy. For ease of explanation detecting means 31 is described as having one output. However, it should be understood that a variety of detectors and outputs could be utilized to obtain the desired results. In this preferred embodiment light passing through transparent section 36, 38, 40 or 42 of reticle 30 produces an electrical square pulse on output lead 24.

A star image located at the center of the telescope image 50 will follow circular path 51. Since circular path 51 is concentric with reticle 30 the amount of time which light is passing through each of the transparent portions will be equal. Thus, the duration of the square pulses will be equal and the duration of time between the square pulses will be equal. If a star image is displaced from the center of the telescope image 50 by some distance, such as the star image 53, a nonconcentric path such as path 52 will be followed. Thus, since the star image travels for a greater length of time in transparent section 36 than it does in transparent section 42, when following circular path 52, the first square pulse on lead 24 will be of longer duration than the second square pulse. Since the star image travels for a longer duration in opaque portion 37 than it does in the other opaque portions, the duration of time between the first and fourth square pulses on lead 24 will be greater than the duration of time between the other square pulses. Thus, it can be seen that the duration of the square pulses will vary in relation to the displacement of the star image from the center of the telescope image. The output square pulses of detector 31 are applied to electronic circuitry which will be explained in conjunction with FIGURE 3.

The square pulses from the commutator 26 appearing on leads 32, 33, 34 and 35 are applied to flip-flop circuits 55, 56, 57 and 58 respectively. All of the flip-flops discussed in conjunction with the FIGURE 3 are of the type which turn on with a first pulse appearing on a lead designated number 1 and turn off at some later time with a pulse appearing on a lead designated with a zero. Lead 32 is connected to the number 1 input of flip-flop 55 so the square pulses appearing thereon turn flip-flop 55 on. The square pulses appearing on lead 32 are also applied to the zero input of flip-flop 58 by means of a lead 60. Thus, any pulses appearing on lead 32 insure that flip-flop 58 is turned off. Lead 33 is connected to the number 1 input of flip-flop 56 so the square pulses appearing thereon will turn flip-flop 56 on. The square pulses on lead 33 are also applied to the zero input of flip-flop 55 by means of a lead 61. Thus, square pulses appearing on lead 33 turn flip-flop 55 off. The lead 34 is connected to the number 1 input of flip-flop 57 and the square pulses appearing thereon turn flip-flop 57 on. Square pulses appearing on lead 34 are also applied to the zero input of flip-flop 56 by means of a lead 62, and are utilized to turn flip-flop 56 off. Lead 35 is connected to the number 1 input of flip-flop 58. Lead 35 is also connected to the zero input of flip-flop 57 by means of a lead 63. Thus, the square pulses appearing on lead 35 turn flip-flop 58 on and flip-flop 57 off.

As the image from telescope 10 is moved in a circular path about reticle 30, commutator 26 produces square pulses first on lead 32, then on lead 33, then on lead 34 and then on lead 35, since the image revolution is counterclockwise with respect to the reticle as indicated by the arrowheads. That is, when the center of image 50 is in portions 37 or 36 of reticle 30 a first square pulse appears on lead 32, when the center is in portion 43 or 42 a square pulse appears on lead 33, when the center is in portion 41 or 40 a square pulse appears on lead 34 and when the center is in portion 39 or 38 a square pulse appears on lead 35. Thus, flip-flop 55 is turned on when the first square pulse appears on lead 32. At some later time a square pulse appears on lead 33 and flip-flop 56 is turned on while flip-flop 55 is turned off. At some later time a square pulse appears on lead 34 and flip-flop 57 is turned on while flip-flop 56 is turned off. Still later a square pulse appears on lead 35 and flip-flop 58 is turned on while flip-flop 57 is turned off.

An "and" circuit 65 has a first input lead 66 connected thereto. A start-stop command is applied to lead 66 and may be a voltage applied by means of a manual switch which simply appears as a square wave, starting when the switch is turned on and stopping when the switch is turned off. The square pulses on lead 32 are applied as a second input to "and" circuit 65 by means of a lead 67. When a positive pulse appears on lead 66 and on lead 67 simultaneously, "and" circuit 65 produces a pulse which is applied to the number 1 input of a flip-flop 68 by means of a lead 69. The start-stop command pulse on lead 66 is also applied to the input of a differentiating circuit 70 by means of a lead 71. As the start-stop command pulse is turned off differentiating circuit 70 produces a pulse from the trailing edge which is applied to the zero input of flip-flop 68 by means of a lead 72. The output of flip-flop 68 is applied to the switch input of a gate circuit 75 by means of a lead 73.

All of the gate circuits in this disclosure are of the type which are open when a pulse is applied to the switch input and are closed when the pulse is removed. The square pulse output from flip-flop 68 is applied to the switching input of gate 75. Thus, when flip-flop 68 is turned on gate 75 is open and when flip-flop 68 is turned off gate 75 is closed.

The square pulse output from the detector 31 appearing on lead 24 is applied to the input of an amplifier 76. The output of amplifier 76 is applied to the input of gate 75 by means of a lead 77. The output of gate 75 is a series of amplified square pulses which are applied to the input of a gate 78 by means of a lead 82. A lead 83 connected to lead 82 applies the square pulses from gate 75 to the input of a gate 79, a lead 84 connected to lead 82 applies the pulses to the input of a gate 80, and a lead 85 connected to lead 82 applies the pulses to the input of a gate 81. The output of flip-flop 55 is applied to the trigger input of gate 78 by means of a lead 86. The output of flip-flop 56 is applied to the trigger input of gate 80 by means of a lead 87. The output of flip-flop 57 is applied to the trigger input of gate 79 by means of a lead 88. The output of flip-flop 58 is applied to the trigger input of gate 81 by means of a lead 89.

It should be noted that the timing and duration of the amplified pulses from detector 31 appearing at the output of gate 75 and the pulses from commutator 26 appearing at the inputs of flip-flops 55 through 58 are such that gate 78 will be open only long enough to allow the first pulse in the sequence from gate 75 to pass therethrough. Thereafter, gate 80 is open and gate 78 is closed thereby allowing the second pulse from gate 75 to pass through gate 80. Gate 80 is then closed and gate 79 is opened allowing the third pulse from gate 75 to pass through gate 79. Gate 81 is then opened and gate 79 is closed allowing the fourth pulse from gate 75 to pass through gate 81. The image from telescope 10 has at this time completed a full circular path on reticle 30 and will start another circle, if the start-stop command pulse on lead 66 is left in the on position the gate will continue the cycle just explained. In the event that no star image appears in the field of view of telescope 10 no pulses are applied to the input of gate 75 and the remaining circuitry is not triggered.

The pulse entering gate 78 from lead 82 is applied to the number 1 input of a flip-flop 90 by means of a lead 91. The output of flip-flop 90 is applied to the trigger input of a gate 92 by means of a lead 93. Thus, when the pulse passes through gate 78 and is applied to the number 1 input of flip-flop 90, flip-flop 90 is turned on and gate 92 is opened. Pulse generating means 95, which in this preferred embodiment is a 100 kilocycle pulse generator, produces pulses which are applied to the input of gate 92 by means of a lead 96. When gate 92 is open the pulses from pulse generator 95 pass through and are applied to the input of a reversible counter 100 by means of a lead 97. It should be noted that reversible counters are used for explanation in this preferred embodiment, but two counters could be used in their place with additional electronics circuitry to apply the counting pulses to the second counter at the desired point rather than reversing the reversible counter 100. The output of the two counters could then simply be subtracted to give the same result that a reversible counter produces.

The square pulse appearing on lead 32 is applied to a flip-flop 101 by means of lead 60 connected to lead 32 and a lead 102 connected to lead 60. Lead 102 is connected to the zero input of flip-flop 101 and the output of flip-flop 101 is connected to the reversible counter 100 by means of a lead 103 in such a manner that a pulse on the zero lead of flip-flop 101 causes the reversible counter 100 to add. The pulse appearing on lead 102 is also applied to the reset of the reversible counter 100 by means of a lead 104. Thus, a pulse appearing on lead 102 causes reversible counter 100 to be reset and also sets it in the "add" position.

The number 2 pulse from gate 75 appearing at the input of gate 80 passes therethrough and is applied to the number 1 input of flip-flop 101 by means of a lead 105. This pulse applied to flip-flop 101 produces an output which reverses counter 100. Thus, pulses from pulse generator 95 applied to counter 100 by means of gate 92 are now subtracted from the total amount of pulses previously applied. It should be noted that the first pulse from detector 31 appearing at the output of gate 75 operates upon the electronics circuit in a manner to cause pulses from pulse generator 95 to be applied to reversible counter 100. The second pulse from detector 31 causes reversible counter 100 to be reversed so that pulses from pulse generator 95 are subtracted from the total pulses therein.

The output of gate 80 is also applied to the number 1 input of a flip-flop 106 by means of a lead 107 attached to lead 105. When flip-flop 106 is turned on by a pulse on lead 107 a square wave is produced which is applied to the trigger input of a gate 108 by means of a lead 109. Pulses from pulse generator 95 are applied to the input of gate 108 by means of a lead 111. The square wave on lead 109 opens gate 108 and allows pulses from pulse generator 95 to be applied by means of lead 110 to the input of a second reversible counter 115.

The pulse appearing on lead 32 is applied to the zero input of a flip-flop 116 by means of a lead 117 connected to lead 102. The pulse from lead 32 is also applied to the reset of reversible counter 115 by means of a lead 118 connected to lead 117. It should be noted that pulses on lead 32 appear before pulses on lead 33 in the sequence. The output of flip-flop 116 is applied to the trigger input of reversible counter 115 by means of a lead 119. When a signal appears at the zero input of flip-flop 116 the output is such as to cause reversible counter 115 to add. Thus, the second pulse in the series of pulses from gate 75 has caused counter 100 to reverse and counter 115 to begin accepting pulses from pulse generator 95.

When the third pulse in line from commutator 26 is applied to flip-flop 57 by means of lead 34, gate 79 is opened and the third pulse in line from gate 75 is allowed to pass therethrough to the input of an "or" circuit 125 by means of a lead 126. The output of "or" circuit 125 is applied to the zero input of flip-flop 90 by means of a lead 127. Thus, an output from "or" circuit 125 causes flip-flop 90 to produce a zero output which turns gate 92 off stopping the pulses of pulse generator 95 from being applied to counter 100. The output of gate 79 is also applied to a delay circuit 128 by means of a lead 129. The output of delay circuit 128 is applied to a readout circuit 130 by means of a lead 131. The output of delay circuit 128 activates the readout circuit so that the count remaining in reversible counter 100 will be applied to a computer or other desired circuitry. A lead 132 attached to lead 129 applies the output of gate 79 to the number 1 input of flip-flop 116. A signal on the number 1 input of flip-flop 116 produces an output on lead 119 which causes counter 115 to subtract, or reverse. Thus, the third pulse in the sequence of pulses from gate 75 has caused reversible counter 100 to turn off and the final count to be indicated at the output while reversible counter 15 has been reversed.

The fourth pulse in sequence from commutator 26 appearing on lead 35 triggers flip-flop 58 which produces an output which opens gate 81. The opening of gate 81 allows the fourth pulse in sequence from gate 75 to pass therethrough and be applied to the input of an "or" circuit 135 by means of a lead 136. The output of "or" circuit 135 is applied to the zero input of flip-flop 106 by means of a lead 137. When the zero input of flip-flop 106 is actuated an output appears on lead 109 which closes gate 108 preventing the pulses from pulse generator 95 from being applied to reversible counter 115. The output pulse from gate 81 is also applied to a delay circuit 138 by means of a lead 139. The output of delay circuit 138 is applied to a readout circuit 140 by means of a lead 141. When readout circuit 140 is actuated the final count in reversible counter 115 is applied to a computer or other desired circuitry.

The image from telescope 10 has now moved completely around the circular path on reticle 30 and a first pulse will appear on lead 32 following the fourth pulse appearing on lead 35. The first pulse on lead 32 again resets counter 100 and counter 115. A lead 42 connected to lead 102 also applies this first pulse to an input of "or" circuit 125. This pulse passes through "or" circuit 125 and appears on gate 127 to insure that flip-flop 90 is in the zero position thereby closing gate 92 and preventing pulses from being applied to counter 100. A lead 143 also connected to lead 102 applies the first pulse to an input of "or" circuit 135. This pulse passes through "or" circuit 135 and is applied to the zero input of flip-flop 106. A pulse on the zero input of flip-flop 106 causes the output to close gate 108 thereby preventing pulses from being applied to reversible counter 150. Therefore, both reversible counters are reset and no pulses are applied until the first pulse in the sequence from the detector 31 appears on lead 24.

A star image, such as star image 53 following path 52, will produce a signal at the output 24 on detector 31, as it passes from opaque portion 37 to transparent portion 36, which in conjunction with a commutator pulse on lead 32 from commutator 26 will cause reversible counter 100 to begin counting pulses from pulse generator 95. As the star image 52 passes from opaque portion 43 to transparent portion 42 of reticle 30 a second pulse appears at the output 24 of detector 31 which in conjunction with a pulse on lead 33 from the commutator 26 causes reversible counter 100 to reverse and reversible counter 115 to begin to count pulses from pulse generator 95. As star image 53 continues along path 52 it travels from opaque portion 41 to transparent portion 40 of reticle 30 thereby producing a third output pulse from detector 31 on lead 24 which in conjunction with the commutator output pulse on lead 34 causes reversible counter 100 to stop counting and reversible counter 115 to reverse counting. Next the star image 53 travels from opaque portion 39 to transparent portion 38 and a pulse is produced on the output lead 24 of detector 31 which in conjunction with the pulse on lead 35 from the commutator 26 causes reversible counter 115 to stop counting. The final count in reversible counter 100 is the difference between the amount of pulses applied to the counter 100 while it was in the add position and the amount of pulses applied to the counter when it was in the subtract position. Since counter 100 is turned on when the star image 53 first enters transparent portion 36, reversed when the star image 53 first enters transparent portion 42 and is stopped when the star image 53 first enters the transparent portion 40 the final count in counter 100 is a direct indication of the difference in the amount of time spent by star image 53 between these points. This can be seen more clearly in conjunction with FIGURE 4.

Figure 4:
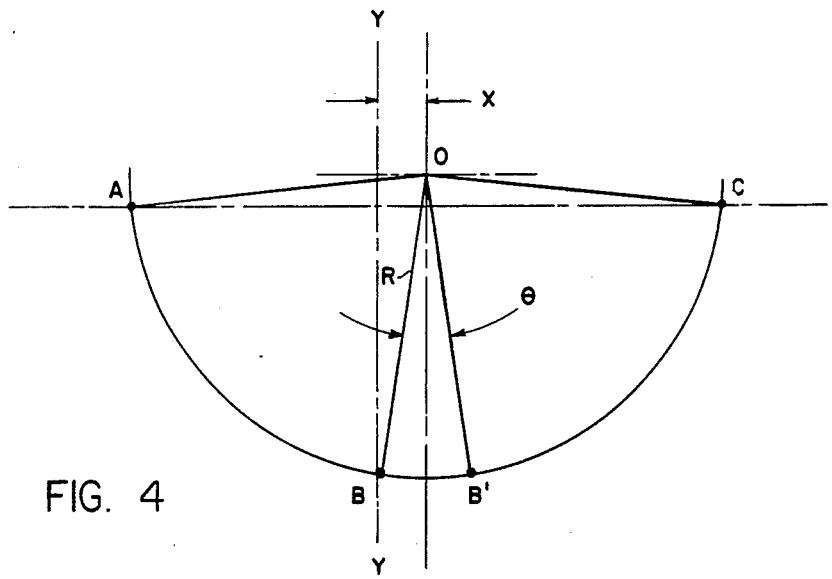
FIGURE 4 is a scanning geometry diagram.

FIGURE 4 is a scanning geometry diagram to illustrate how a star image not at the center at the field of view of telescope 10 is located. The point 0 is the center of the circle about which the star image is moved. Looking at FIGURE 2 for example, star 53 is moved about circle 52. The center of circle 52 is an example of point 0. Looking at FIGURE 4, when the star image crosses the X axis at point A reversible counter 115 begins to count the constant rate pulses applied from pulse generator 95. Point A could be any point along the junction of transparent portion 42 and opaque portion 43 of reticle 30, for example the point where circle 52 crosses. When the star image crosses the Y axis at B, the reversible counter 115 reverses. Point B can be located anywhere along the junction of transparent portion 40 and opaque portion 41 of reticle 30, for example the point where circle 52 crosses. When the star image again crosses the X axis at C, the reversible counter 115 is stopped and shortly thereafter the final count is applied to a computer or other electrical device. Point C can be located anywhere along the junction of transparent portion 38 and opaque portion 39 of reticle 30, for example the point where circle 52 crosses. The final count in reversible counter 115 represents the difference in length between arc AB and arc BC, it is equal to the arc BB'. The point B' is placed on the arc AC at a point which is the same distance from C that B is from A. This point was determined by simple geometry in FIGURE 4 simply for illustrative purposes. The length of this arc is actually determined by the number of pulses in counter 115 and the pulse rate of pulse generator 95. The line OB is equal to the radius circle about which the star image moves. Since the value of this circle is always constant it can be accurately measured and calibrated.

The distance X, which is the distance the star image is displaced from the center of the field of view of the telescope 10 along the X axis, can be determined from the following formula.

$$X \simeq \frac{R \pi \frac{N}{N_t}}{S}$$

Where X is the X coordinate of the telescope pointing error in arc seconds, R is the radius of the circle about which the star image moves in inches, N is the reversible counter 115 readout, $N_t$ is the counting pulse rate from pulse generator 95 multiplied by the time required for one rotation of the motor 22, and S is the scale factor of the reticle 30 in inches per arc seconds. The Y coordinate errors are computed by utilizing the same formula and the readout from the reversible counter 100. Thus, a readout is obtained from counters 100 and 115 which is a direct indication of the telscope pointing error, or the distance the star image appears from the center of the field of view of the telscope. Thus, extremely accurate digital readouts are obtained from reversible counters 100 and 115 which are a direct indication of the pointing error of the telescope.

The readings from the reversible counters 100 and 115 may be applied to a computer where the actual error in arc seconds can be computed utilizing the previously given formula. This error can then be applied directly to navigational computations rather than constantly servoing the telescope as in prior devices. This possibility produces several distinct advantages one of which is that the output of the reversible counters 100 and 115 can be averaged. By including averaging circuits in readout circuits 130 and 140 the outputs of reversible counters 100 and 115 are averaged over several cycles of the star image about the reticle 130. Thus, any pulses that are lost during the various switching operations are compensated by any pulses gained and the final output on the circuitry is more accurate. Another advantage to be gained by not servoing the telescope continually is the great reduction in costly equipment and weight, since the costly and precise servomotors and pickoffs utilized to continually servo the telescope are not necessary.

What has been described is considered to be the preferred embodiment of this invention, but it should be understood that various changes and modifications thereof may be made without departing from the spirit and scope of the invention as defined in the appended claims.

I claim:

1. A radiation tracking device comprising: image forming means; a reticle having a plurality of alternate transparent and opaque portions arranged in a circular pattern; means for causing movement of the image of said image forming means at a substantially constant speed in a circle across said portions of said reticle; radiation detecting means mounted in alignment with said reticle so as to receive radiation passing therethrough; first and second reversible counting means; means connected to said radiation detecting means and said first and second counting means for actuating, reversing and stopping said first and second counting means upon receiving predetermined signals from said radiation detecting means, relatively high frequency pulse producing means; and means connecting said first and second counting means to said pulse producing means, said first counting means producing a digital output indicative of the distance of a radiation source from the center of the field of view of said image forming means along a first axis and said second counting means producing a digital output indicative of the distance of a radiation source from the center of the field of view of said image forming means along a second axis.

2. A radiation tracking device comprising: image forming means; a reticle having a plurality of alternate transparent and opaque portions arranged in a circular pattern; means for causing movement of the image of said image forming means at a substantially constant speed in a circle across said portions of said reticle; radiation detecting means mounted in alignment with said reticle so as to receive radiation passing therethrough, said radiation detecting means indicating the approximate position of the image with respect to said reticle; relatively high frequency pulse producing means; first and second reversible counting means; means connecting said radiation detecting means to said first and second counting means for actuating, reversing and stopping said first and second counting means upon the image reaching predetermined positions with respect to said reticle; and means connecting said first and second counting means to said pulse producing means; said first counting means producing a digital output indicative of the distance of a radiation source from the center of the field of view of said image forming means along a first axis and said second counting means producing a digital output indicative of the distance of the radiation source from the center of the field of view of said image forming means along a second axis.

3. A radiation tracking device comprising: image forming means; a reticle having a plurality of alternate transparent and opaque portions arranged in a circular pattern; means for causing movement of the image of said image forming means at a substantially constant speed in a circle across said portions of said reticle; radiation detecting means mounted in alignment with said reticle so as to receive radiation passing therethrough, said radiation detecting means indicating the approximate position of the image with respect to said reticle; relatively high frequency pulse producing means; a plurality of counting means; means connecting said radiation detecting means to said plurality of counting means for actuating and stopping said plurality of counting means upon the image reaching predetermined positions with respect to said reticle; and means connecting said plurality of counting means to said pulse producing means, said plurality of counting means producing digital outputs indicative of the distance of a radiation source from the center of the field of view of said image forming means.

References Cited by the Examiner

UNITED STATES PATENTS

| | | | |
|---|---|---|---|
| 2,947,986 | 8/1960 | Marner et al. | 250—203 X |
| 2,965,762 | 12/1960 | Turck | 250—203 |
| 2,981,843 | 4/1961 | Hansen | 250—203 |
| 3,031,721 | 5/1962 | Collison | 250—203 |
| 3,035,478 | 5/1962 | Laycak | 88—14 |
| 3,076,095 | 1/1963 | Becklund et al. | 250—203 |
| 3,080,485 | 3/1963 | Saxton | 250—203 |
| 3,099,748 | 7/1963 | Weiss | 250—203 |

RALPH G. NILSON, *Primary Examiner.*

ARCHIE R. BORCHELT, *Examiner.*

E. STRICKLAND, M. A. LEAVITT,
*Assistant Examiners.*